United States Patent Office 3,660,440
Patented May 2, 1972

3,660,440
NONADECAPENTA - 1,6,9,13,18-ENE-10-METHYL CARBOXYLATE AND THE PRODUCTION THEREOF
Gunther Wilke, Paul Heimbach, and Claus Delliehausen, Mulheim (Ruhr), Germany, assignors to Studiengesellschaft Kohle mbH, Mulheim (Ruhr), Germany
No Drawing. Filed Sept. 22, 1969, Ser. No. 860,073
Claims priority, application Germany, Sept. 27, 1968, P 17 93 503.4
Int. Cl. C07c 67/00, 69/52
U.S. Cl. 260—410.9 R       9 Claims

ABSTRACT OF THE DISCLOSURE

There is provided as a new compound nonadecapenta-1,6,9,13,18-ene-10-methyl carboxylate. This is prepared by reaction of methyl methacrylate with butadiene in the presence of zero-valent nickel or by reaction of butadiene with undecatri-1,5,10-ene-2-methyl carboxylate formed as an intermediate which may be isolated or not as desired.

---

The present invention relates to nonadecapentaene methyl carboxylate and the production thereof by a selective catalytic co-oligomerisation of unsaturated compounds and represents a further development of the co-oligomerisation processes of similar type which have already been described.

French patent specification 1,499,478 describes a process for the production of substituted 8-, 10- and 12-ring systems by catalytic co-oligomerisation of unsaturated compounds. In accordance with that process, 1,3-diolefines which may be substituted are reacted with a substituted 1,3-diolefine or with a cyclic unsaturated hydrocarbon or with more than one cyclic and/or acyclic unsaturated hydrocarbons. By this means, for example, substituted 12-ring systems are obtained with co-reaction of butadiene and isoprene on catalysts of zero-valent nickel. From butadiene, ethylene and isoprene, methyl cyclodecadiene is formed by co-reaction. Under the action of a catalyst produced from nickel acetyl acetonate, tri-(o-phenyl-phenyl) phosphite and nonaethoxydiethyl aluminium a product is produced from butadiene and ethyl acrylate which produces, inter alia, after hydrogenation, cyclodecanecarboxylic acid ethyl ester.

According to French patent specification 1,433,409 a process is claimed for the production of acetylenically unsaturated carboxylic acid esters from 2 molecules of a conjugated diene and one molecule of an acrylic or methacrylic acid ester. According to this process, if butadiene and methyl acrylate (molar ratio 5:1) are allowed to act on a catalyst of triphenyl phosphine, nickel acetyl acetonate and ethoxy diethyl aluminium, then inter alia undecatri-2,5,10-ene-methyl carboxylate is obtained.

CH₂=CH—CH₂—CH₂—CH₂CH=CH—CH₂—CH=
CH—COOCH₃

According to this process, therefore, at least two molecules of a conjugated diolefine are reacted with one molecule of an acrylic acid ester with a zero-valent nickel complex, if desired in the presence of an electron donor.

The reaction of methacrylic acid esters is claimed in similar manner in French Pat. 1,433,409, clearly on the assumption that the methacrylic acid ester supplies similar products. According to the process indicated, a compound of the following structure

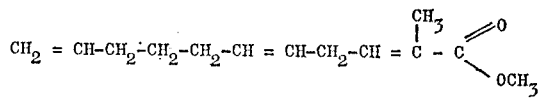

would have to be formed, i.e. an undecatri-2,5,10-ene-2-methyl carboxylate.

It has now surprisingly been found that results which differ in two respects from that which is to be expected are obtained when the methacrylic acid ester is used; it is true that by using suitable catalysts, initially also each two molecules of butadiene react with 1 molecule of methyl methacrylate, but a compound is obtained which has the following structure

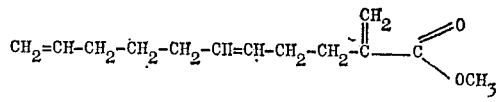

i.e. the compound is the undecatri-1,5-10-ene-2-methyl carboxylate. The reaction can be checked at this stage. However, if more butadiene is reacted then once again surprisingly two additional molecules of butadiene react per molecule of ester.

The invention is concerned with the selective reaction of the undecatri-1,5,10-ene-2-methyl carboxylate with 2 additional molecules of butadiene or directly of methyl methacrylate with 4 molecules of butadiene, with a high degree of conversion of the ester being used, in the presence of zero-valent nickel complexes, to give nonadecapenta-1,6,9, 13,18-ene-10-methyl carboxylate.

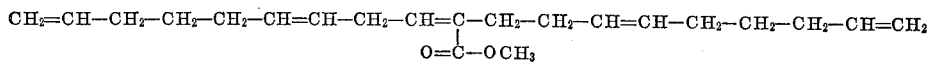

and to this C₁₉-pentaene-carboxylic acid ester, which is a new compound. This ester is advantageously obtained if, for example, a butadiene-saturated solution of a catalyst of nickel acetyl acetonate and monoethoxy diethyl aluminium is added to the butadiene-saturated undecatrienecarboxylic acid ester and butadiene is introduced, advantageously at temperatures from 40 to 90° C. The C₁₉-pentaenecarboxylic acid ester is formed with yields of more than 90%, based on the amount of ester which reacts.

The process according to the invention is also successful if, at the time of producing the catalyst, other electron donors, such as triphenyl phosphine or triphenyl phosphite, are added to the butadiene. The nickel compound is however preferably only reduced in the presence of butadiene. Compounds in which the nickel already exists in zero-valent form, valent Ni, as for example in [cyclooctadi-1,5-ene]₂ Ni or Ni(CO)₄ or Ni[P(C₆H₅)₃]₄ are also suitable catalysts for the reaction which is described.

A process is therefore described herein for the production of an unsaturated carboxylic acid ester with the use of catalysts of Ni-(O), which is characterised in that methyl methacrylate and butadiene are allowed to react with a high degree of conversion of the ester.

The process according to the invention is preferably carried out in the presence of inert solvents, such as benzene or toluene, under normal pressure and at temperatures from 20 to 120°, advantageously 40 to 90° C.

The compound which can be produced in accordance with the process is as an unsaturated ester, valuable starting materials or auxiliaries in the production of high polymers, more especially monomers which, incorporated into copolymers, are suitable for facilitating a subsequent cross-linking.

The following examples illustrate the invention:

EXAMPLE 1

In 100 g. of benzene, 4.38 g. (17.05 mmol) of nickel acetyl acetonate were reduced with 4.5 g. (34.6 mmol) of ethoxydiethyl aluminium at 0° C. in the presence of 10 g. of butadiene and 4.4 g. (17.1 mmol) of triphenyl phosphine. The production of the catalyst was completed after 1½ hours. 188 g. of undecatri-1,5,10-ene-2-methyl carboxylate (86%), saturated with butadiene at room temperature, were added to the mixture, the total reaction mixture was heated to 90° C. and butadiene was introduced for 1 hour under normal pressure.

The supply of butadiene was stopped, the reaction mixture cooled to 0° C., 20 ml. of water and 15–20 ml. of 5N—HCl were added and air was blown through the reaction mixture until the colour had changed from reddish-orange to light green. The organic phase was separated and successively washed neutral with water, $NaHCO_3$ solution and water, dried over anhydrous sodium sulphate and thereafter distilled at $10^{-4}$ mm. Hg. Under these conditions, undecatri-1,5,10-ene-2-methyl carboxylate boils between 70 and 85° C. and the nonadecapenta-1,6,9,13,18-ene-10-methyl carboxylate boils between 140 and 165° C.

In addition to 55.8 g. (34.5%) of unreacted undecatri-1,5,10-ene-2-methyl carboxylate there was obtained as reaction product:

| | Grams | Percent |
|---|---|---|
| Vinylcyclohexene (VCH) | 2.0 | 0.9 |
| Cyclooctadi-1,5-ene (COD) | 20.0 | 9.2 |
| Cyclododecatri-1,5,9-ene (CDT) | 2.0 | 0.9 |
| Nonadecapenta-1,6,9,13,18-ene-10-methyl carboxylate | 153.5 | 70.6 |
| 17 substances (composition unknown) | 27.9 | 12.8 |
| Residue | 12.3 | 5.6 |
| Total | 217.7 | 100.0 |

EXAMPLE 2

In 50 g. of benzene, 2.19 g. (8.53 mmol) of nickel acetyl acetonate were reduced at 0° C. with 2.25 g. (17.3 mmol) of ethoxydiethyl aluminium in the presence of 10 g. of butadiene and 2.24 g. (8.53 mmol) of triphenyl phosphine. This reaction mixture was added to 195 g. of methyl methacrylate saturated with butadiene at room temperature. The reaction mixture was then heated to 60° C. and butadiene was introduced for 10 hours under normal pressure.

The product was worked up as described in Example 1.

In addition to 163.5 g. (83.9%) of unreacted methyl methacrylate, the following were obtained as reaction products:

| | Grams | Percent |
|---|---|---|
| Octatriene | 0.7 | 0.8 |
| VCH | 1.4 | 1.6 |
| COD | 17.5 | 19.4 |
| Undecatri-1,5,10-ene-2-methyl carboxylate | 50.0 | 55.4 |
| Nonadecapenta-1,6,9,13,18-ene-10-methyl carboxylate | 3.6 | 4.0 |
| 12 substances (unknown) | 5.1 | 5.6 |
| Residue | 11.9 | 13.2 |
| Total | 90.2 | 100.0 |

EXAMPLE 3

In 50 g. of benzene, 2.19 g. (8.53 mmol) of nickel acetyl acetonate were reduced with 2.25 g. (17.3 mmol) of ethoxydiethyl aluminium in the presence of 10 g. of butadiene and 2.65 g. (8.55 mmol) of triphenyl phosphite at 0° C. 190 g. of methyl methacrylate saturated at room temperature with butadiene were added to the reaction mixture and this was treated at 60° and under normal pressure for 8 hours with butadiene.

The working up procedure was carried out according to Example 1.

In addition to 174.5 g. (91.8%) of recovered methyl methacrylate, the following reaction products were obtained:

| | Grams | Percent |
|---|---|---|
| Octatriene | 2.8 | 4.5 |
| VCH | 1.4 | 2.3 |
| COD | 26.4 | 42.8 |
| Undecatri-1,5,10-ene-2-methyl carboxylate | 19.4 | 31.4 |
| Nonadecapenta-1,6,9,13,18-ene-10-methyl carboxylate | 1.4 | 2.3 |
| 4 substances (unknown) | 1.1 | 1.8 |
| Residue | 9.2 | 14.9 |
| Total | 61.7 | 100.0 |

EXAMPLE 4

2.19 g. (8.53 mmol) of Ni(acac)$_2$ were dissolved in 50 g. of toluene, 2.65 g. (8.53 mmol) of triphenyl phosphite and 15 g. of butadiene were added and then mixed with 2.25 g. (17.3 mmol) of monoethoxydiethyl aluminium at 0° C. After 1½ hours, the catalyst solution was added to 60 g. of methyl methacrylate saturated at 20° C. with butadiene, heated to 50° C. and then butadiene was introduced for 28 hours at 50° C. while stirring. Working up was carried out according to Example 1.

| | Grams | Percent |
|---|---|---|
| Methacrylate recovered | 25.9 | 43.2 |
| Conversion based on methyl methacrylate | | 54.8 |
| Composition of the reaction product: | | |
| COD | 31.9 | 21.5 |
| CDT | 5.8 | 3.9 |
| Undecatri-1,5-10-ene-2-methyl carboxylate | 22.4 | 15.1 |
| Nonadecapenta-1,6,9,13,18-ene-10-methyl carboxylate | 69.9 | 47.2 |
| 14 substance (unknown) | 8.9 | 6.0 |
| Residue | 9.3 | 6.3 |
| Total | 148.2 | 100.0 |

EXAMPLE 5

In 50 g. of benzene, 2.19 g. (8.53 mmol) of nickel acetyl acetonate were reduced in the presence of 10 g. of butadiene at 0° C. with 2.25 g. (17.3 mmol) of ethoxydiethyl aluminium, 180 g. of methyl methacrylate saturated at room temperature with butadiene were added to the mixture and, at 40° C., butadiene was introduced for 16 hours. Working up was carried out according to Example 1. In addition to 144.5 g. (80.3%) of methyl methacrylate, the following products were obtained:

| | Grams | Percent |
|---|---|---|
| CDT | 1.3 | 2.2 |
| Undecatri-1,5,10-ene-2-methyl carboxylate | 39.6 | 67.9 |
| Nonadecapenta-1,6,9,13,18-ene-10-methyl carboxylate | 11.4 | 19.6 |
| Residue | 6.0 | 10.3 |
| Total | 58.3 | 100.0 |

EXAMPLE 6

2.19 g. (8.53 mmol) of Ni(acac)$_2$ were dissolved in 50 ml. of toluene and, in the presence of 10 g. of butadiene and at 0° C., 2.25 g. (17.3 mmol) of diethylmonoethoxy aluminum were added. After 1½ hours, the catalyst solution was added to 30 g. of butadiene saturated methyl methacrylate, the mixture was heated to 50° C. and butadiene was introduced for 20 hours at this temperature. After 20 hours, the experiment was stopped and the mixture worked as described in Example 1.

The methyl methacrylate had reacted quantitatively. The composition of the reaction product was:

|  | Grams | Percent |
|---|---|---|
| VCH | 2.6 | 2.3 |
| COD | 0.5 | 0.4 |
| CDT | 19.1 | 16.6 |
| Undecatri-1,5,10-ene-2-methyl carboxylate | 3.3 | 2.9 |
| Nonadecapenta-1,6,9,13,18-ene-10-methyl carboxylate | 80.4 | 69.9 |
| 8 substances (unknown) | 1.9 | 1.6 |
| Residue | 7.3 | 6.3 |
| Total | 115.1 | 100.0 |

EXAMPLE 7

To 60 g. of methyl methacrylate ester saturated at 20° C. with butadiene were added 2.34 g. (8.53 mmol) of $COD_2Ni$, the mixture being heated to 50° C. and butadiene being introduced at this temperature while stirring. After 22 hours, the experiment was stopped and the product worked up as in Example 1.

|  | Grams | Percent |
|---|---|---|
| Methacrylic acid methyl ester recovered | 20.2 | 33.6 |
| Conversion based on methyl methacrylate |  | 65.5 |
| Composition of the reaction product: |  |  |
| COD | 2.6 | 1.9 |
| CDT | 6.8 | 4.9 |
| Undecatri-1,5,10-ene-2-methyl carboxylate | 26.0 | 18.8 |
| Nonadecapenta-1,6,9,13,18-ene-10-methyl carboxylate | 84.3 | 61.0 |
| 10 substances (unknown) | 8.7 | 6.3 |
| Residue | 9.8 | 7.1 |
| Total | 138.2 | 100.0 |

EXAMPLE 8

To 60 g. of methyl methacrylate saturated at 20° C. with butadiene were added 1.46 g. (8.53 mmol) of $Ni(CO)_4$ in 40 ml. of toluene. The reaction mixture was then heated to 50° C. and butadiene was introduced while stirring. The experiment was stopped after 18 hours and the product worked up as in Example 1.

|  | Grams | Percent |
|---|---|---|
| Methyl methacrylic recovered | 36.3 | 60.5 |
| Conversion based on the methyl methacrylate |  | 39.0 |
| Composition of the reaction product: |  |  |
| COD | 7.6 | 9.2 |
| CDT | 3.6 | 4.4 |
| Undecatri-1,5,10-ene-2-methyl carboxylate | 18.2 | 22.1 |
| Nonadecapenta-1,6,9,13,18-ene-10-methyl carboxylate | 46.2 | 56.2 |
| 4 substances (unknown) | 2.5 | 3.0 |
| Residue | 4.2 | 5.1 |
| Total | 82.3 | 100.0 |

EXAMPLE 9

To 60 g. of methyl methacrylate saturated at 20° C. with butadiene were added 9.44 g. (8.53 mmol) of Ni(triphenylphosphite)$_4$. The reaction mixture was then heated to 50° C. and butadiene was introduced with stirring. The experiment was stopped after 15 hours and the product worked up as in Example 1.

|  | Grams | Percent |
|---|---|---|
| Methyl methacrylate recovered | 38.8 | 64.7 |
| Conversion based on methyl methacrylate |  | 26.7 |
| Composition of the reaction product: |  |  |
| COD | 31.6 | 35.0 |
| CDT | 0.8 | 0.9 |
| Undecatri-1,5,10-ene-2-methyl carboxylate | 10.5 | 11.6 |
| Nonadecapenta-1,6,9,13,18-ene-10-methyl carboxylate | 34.4 | 38.0 |
| 10 substances (unknown) | 3.5 | 3.9 |
| Residue | 9.6 | 10.6 |
| Total | 90.4 | 100.0 |

We claim:
1. Nonadecapenta-1,6,9,13,18 - ene - 10 - methyl carboxylate.
2. A process for the production of nonadecapenta-1,6,9,13,18-ene-10-methyl carboxylate which comprises reacting undecatri-1,5,10-ene-2-methyl carboxylate with 2 molecular proportions of butadiene in the presence of a zero-valent nickel complex catalyst.
3. A process as claimed in claim 2 carried out in an inert solvent at a temperature of from 20 to 120° C.
4. A process as claimed in claim 2 carried out in an inert solvent at a temperature of 40–90° C.
5. A process for the production of nonadecapenta-1,6,9,13,18-ene-10-methyl carboxylate which comprises reacting methyl methacrylate with 4 molar proportions of butadiene in the presence of a zero-valent nickel complex catalyst.
6. A process as claimed in claim 5 carried out in an inert solvent at a temperature of from 20 to 120° C.
7. A process as claimed in claim 5 carried out in an inert solvent at a temperature of 40–90° C.
8. A process as claimed in claim 2 wherein said catalyst is a member selected from the group consisting of tetrakistriphenyl phosphine nickel (O), nickel tetracarbonyl and nickel (O) dicyclooctadiene.
9. A process as claimed in claim 5 wherein said catalyst is a member selected from the group consisting of triphenylphosphenyl nickel (O), triphenylphosphite nickel (O), nickel (O) butadiene, dicyclooctadienyl nickel (O) and nickel tetracarbonyl.

References Cited

UNITED STATES PATENTS 3,493,590   2/1970   Chabardes ———— 260—410.9

OTHER REFERENCES

Chemical Abstracts, vol. 59, 9879d (1963).

LEWIS GOTTS, Primary Examiner

D. G. RIVERS, Assistant Examiner

U.S. Cl. X.R.

260—89.3

UNITED STATES PATENT OFFICE
CERTIFICATE OF CORRECTION

Patent No. 3,660,440                    Dated May 2, 1972

Inventor(s) Gunther Wilke et al

It is certified that error appears in the above-identified patent and that said Letters Patent are hereby corrected as shown below:

Col. 4, line 55 insert "unreacted" between "of" and "methyl".

Col. 5, line 14 delete "ester".

Col. 5, (TABLE) Example 7 delete "Methacrylic acid methyl ester" and insert -- methyl methacrylate".

Col. 6, line 46

Signed and sealed this 6th day of March 1973.

(SEAL)
Attest:

EDWARD M. FLETCHER, JR.          ROBERT GOTTSCHALK
Attesting Officer                Commissioner of Patents